(12) United States Patent
Nakazawa

(10) Patent No.: US 10,652,424 B2
(45) Date of Patent: May 12, 2020

(54) COMMUNICATION APPARATUS, COMMUNICATION METHOD, AND NONTRANSITORY COMPUTER READABLE STORAGE MEDIUM THAT RESENDS DATA WHEN NO RESPONSE IS RECEIVED AND RECORDS THE RESULT

(71) Applicant: CANON KABUSHIKI KAISHA, Tokyo (JP)

(72) Inventor: Toshiyuki Nakazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/860,215

(22) Filed: Jan. 2, 2018

(65) Prior Publication Data
US 2018/0220033 A1  Aug. 2, 2018

(30) Foreign Application Priority Data
Jan. 30, 2017  (JP) ................. 2017-014514

(51) Int. Cl.
*H04N 1/32* (2006.01)
*H04N 1/00* (2006.01)
*H04N 1/327* (2006.01)

(52) U.S. Cl.
CPC ..... *H04N 1/32523* (2013.01); *H04N 1/00832* (2013.01); *H04N 1/32053* (2013.01); *H04N 1/3278* (2013.01); *H04N 1/32619* (2013.01); *H04N 1/32694* (2013.01); *H04N 2201/0039* (2013.01); *H04N 2201/0094* (2013.01)

(58) Field of Classification Search
CPC combination set(s) only.
See application file for complete search history.

(56) References Cited

U.S. PATENT DOCUMENTS

2011/0064076 A1\* 3/2011 Matsuo ............ H04L 29/12066
370/389

FOREIGN PATENT DOCUMENTS

JP    2009212796 A    9/2009

\* cited by examiner

*Primary Examiner* — Helen Zong
(74) *Attorney, Agent, or Firm* — Rossi, Kimms & McDowell LLP

(57) ABSTRACT

A communication apparatus comprises: a sending unit that sends data to a designated destination; a receiving unit that receives a response to the send by the sending unit; a recording unit that records information relating to a send when the send is performed by the sending unit, and associates and records, when a response to the send is further received by the receiving unit, information of a send-source of the response; and a control unit that causes the sending unit to resend data based on information recorded in the recording unit, wherein the control unit causes the sending unit to resend data to a destination indicated by information, among the recorded information, for which a predetermined time has elapsed since the recording and for which a response has not been received by the receiving unit.

7 Claims, 12 Drawing Sheets

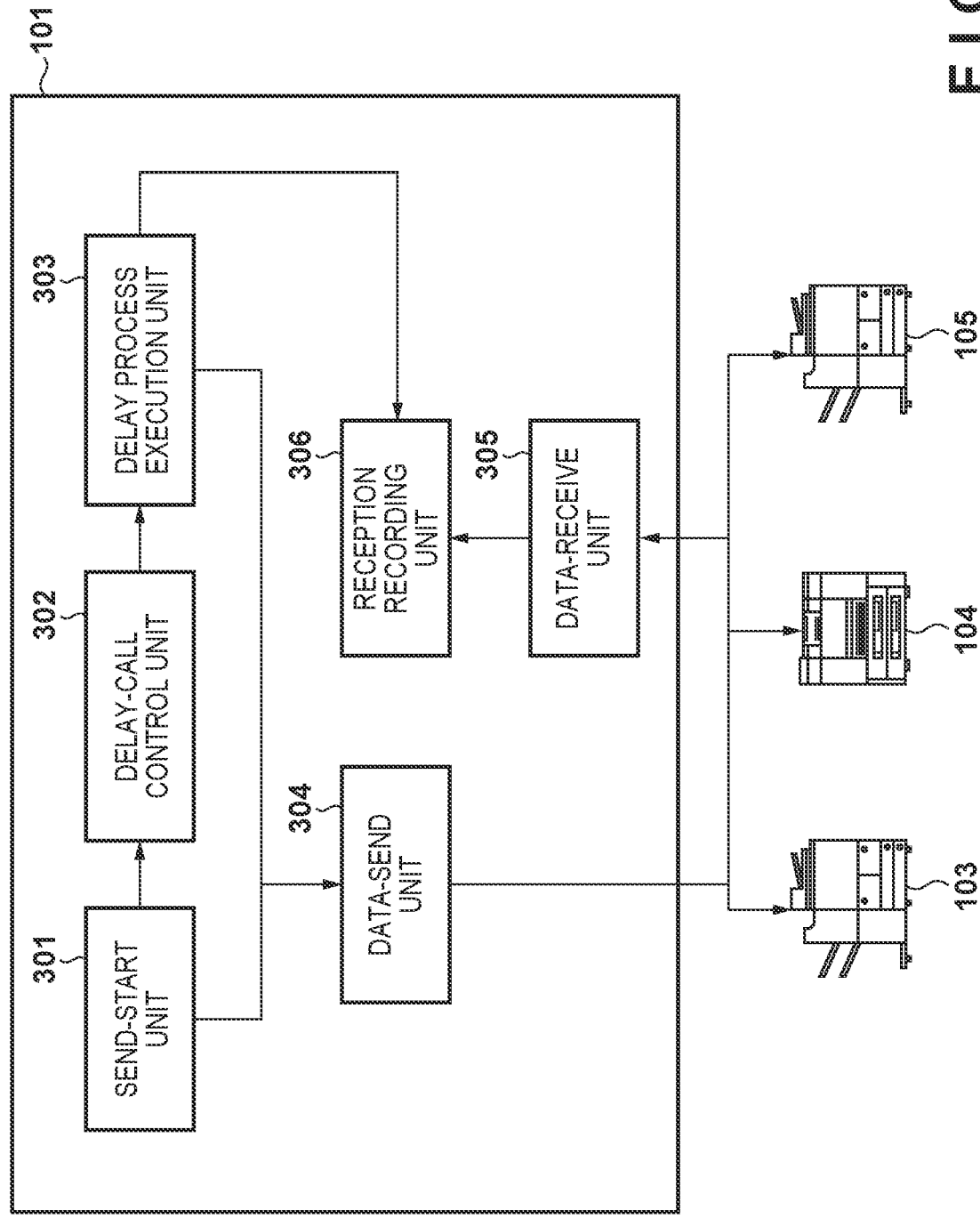

COMMUNICATION APPARATUS, COMMUNICATION METHOD, AND NONTRANSITORY COMPUTER READABLE STORAGE MEDIUM THAT RESENDS DATA WHEN NO RESPONSE IS RECEIVED AND RECORDS THE RESULT

BACKGROUND OF THE INVENTION

Field of the Invention

The present invention relates to a communication apparatus, a communication method, and a non-transitory computer-readable storage medium.

Description of the Related Art

Japanese Patent Laid-Open No. 2009-212796 gives a configuration as a communication means for sending/receiving data without performing a conventional handshake for establishing a connection to a communication destination.

Japanese Patent Laid-Open No. 2009-212796 comprises a means for, whenever data is sent, sequentially recording send-data-specification-information for specifying the data that is sent and a means for, when a destination to which data was sent sends back data confirming reception, sequentially recording receive-data-specification-information for specifying this. Also, send-data-specification-information, for which no pair was found in a comparison of the recorded information and for which a maximum time delay until the arrival of the receive-data-specification-information is exceeded, is extracted as undelivered-send-data, and the send-data corresponding to the send-data-specification-information that was extracted is resent to a predetermined counterparty.

However, in the above-described conventional technique, there is no means for sending data again in the case where there is no reception of data corresponding to the data that is resent. Also, because it is not recorded that data was resent, there is a problem in that in a case where undelivered-send-data is extracted a number of times, the same send-data-specification-information is extracted. Meanwhile, in a case of configuring so as to simultaneously resend a plurality of times after having performed a handshake, it is necessary to provide communication ports to correspond to the number of send destinations.

SUMMARY OF THE INVENTION

According to one aspect of the present invention, there is provided a communication apparatus that performs communication with apparatuses connected via a network, comprising: a sending unit configured to send data to a designated destination; a receiving unit configured to receive a response to the send by the sending unit; a recording unit configured to record information relating to a send when that send is performed by the sending unit, and to associate and record, when a response to the send is further received by the receiving unit, information of a send-source of the response; and a control unit configured to cause the sending unit to resend data based on information recorded in the recording unit, wherein the control unit causes the sending unit to resend data to a destination indicated by information, among the information recorded in the recording unit, for which a predetermined time has elapsed since the recording and for which a response has not been received by the receiving unit.

According to another aspect of the present invention, there is provided a communication method in a communication apparatus connected to an apparatus via a network, the method comprising: sending data to a designated destination; receiving a response to the sending of the data; recording in a recording unit information relating to a sending of data when that sending is performed, and to associating and recording, when a response to that sending is further received, information of a send-source of that response; and causing data to be resent based on the information recorded in the recording unit, wherein data is caused to be resent to a destination indicated by information, among the information recorded in the recording unit, for which a predetermined time has elapsed since the recording and for which a response has not been received.

According to another aspect of the present invention, there is provided a non-transitory computer-readable storage medium storing a program for causing a computer to function as: a sending unit configured to send data to a designated destination; a receiving unit configured to receive a response to the data sent by the sending unit; a recording unit configured to record information relating to a send when that send is performed by the sending unit, and to associate and record, when a response to that send is further received by the receiving unit, information of a send-source of that response; and a control unit configured to cause the sending unit to resend data based on information recorded in the recording unit, wherein the control unit causes the sending unit to resend data to a destination indicated by information, among the information recorded in the recording unit, for which a predetermined time has elapsed since the recording and for which a response has not been received by the receiving unit.

By virtue of the invention of the present application, it becomes possible to resend, a plurality of times, send-data for which no response is returned while economizing communication ports of a host.

Further features of the present invention will become apparent from the following description of exemplary embodiments (with reference to the attached drawings).

BRIEF DESCRIPTION OF THE DRAWINGS

FIG. 3 is a view illustrating an example of a configuration of a processing unit according to a first embodiment.

DESCRIPTION OF THE EMBODIMENTS

First Embodiment

Hereinafter, embodiments for working the present invention are explained using the drawings.

[System Configuration]

Figure 1:
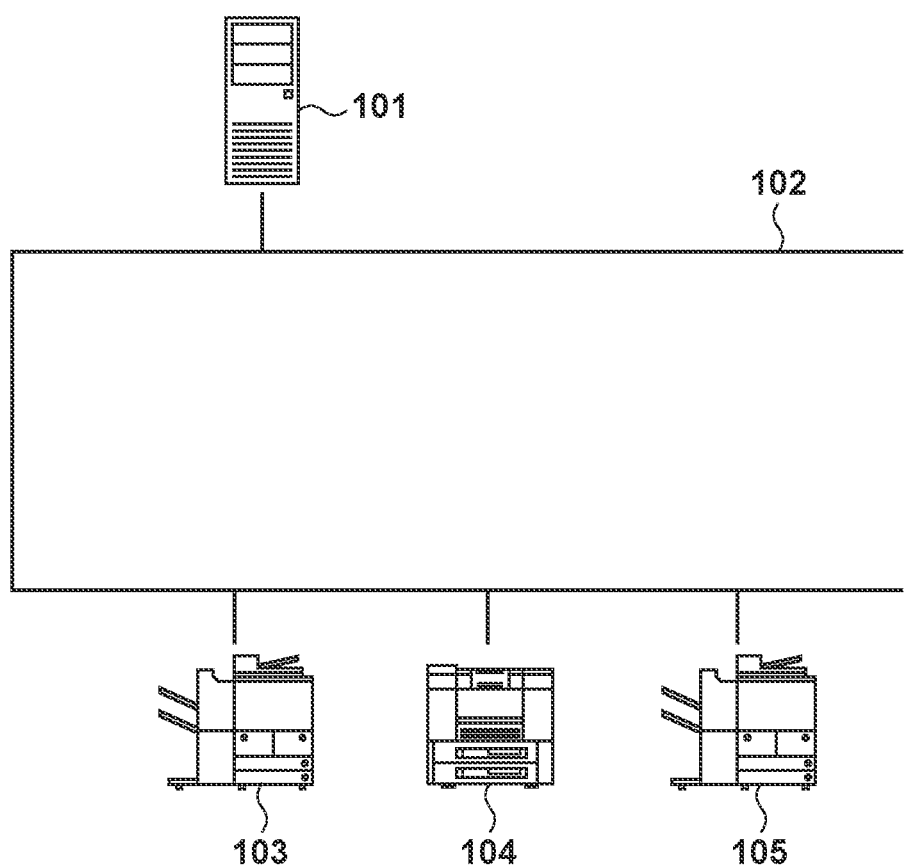
FIG. 1 is a block diagram illustrating a configuration of a network device management system.

FIG. 1 is a view for illustrating an example of a configuration of a network device management system according to a first embodiment of the present invention. In FIG. 1, a host computer 101 functions as a host computer in the network device management system. Image forming apparatuses 103, 104, and 105 are image forming apparatuses which are the targets of the management. Note, the number of image forming apparatuses is not limited to this, and configuration may be taken such that more image forming apparatuses are connected. Also, although a network printer, an MFP (Multi-Function Peripheral), a copy machine, and the like are applied as the image forming apparatuses, no particular limitation is made to this. Also, there is no limitation to image forming apparatuses as the target of management as network devices, and other devices that are to be managed by the host computer 101 may be applied.

The host computer 101 and the image forming apparatuses 103, 104, and 105 are connected to a network 102, and each apparatus can mutually communicate via the network 102. The host computer 101 performs communication with the image forming apparatuses 103, 104, and 105 via the network 102. Here, SNMP (Simple Network Management Protocol) is used for communication with each image forming apparatus. SNMP is a protocol that operates on top of UDP (User Diagram Protocol). In UDP, data is sent to a data-send-destination without performing a prior handshake.

UDP has the characteristics described below. A sending process and a receiving process can be separated. For example, in the sending process, a port, on which the receiving process is awaiting a reception, sends, as a send-source-port, data to a plurality of destinations. On the side of the destinations, which receive this data, UDP responses are sent to the send-source-port. In the receiving process, the responses from the plurality of destinations can be received. By this, it becomes possible realize sending and receiving of data to the plurality of destinations by using less processes and ports. On the other hand, in TCP (Transmission Control Protocol), which requires a handshake, a sending process and a receiving process are necessary for each destination.

Also, in UDP, since no handshake is performed, there is no mechanism for resending in a case in which it is confirmed that no data was received by a destination to which data was sent.

(Hardware Configuration)

Figure 2:
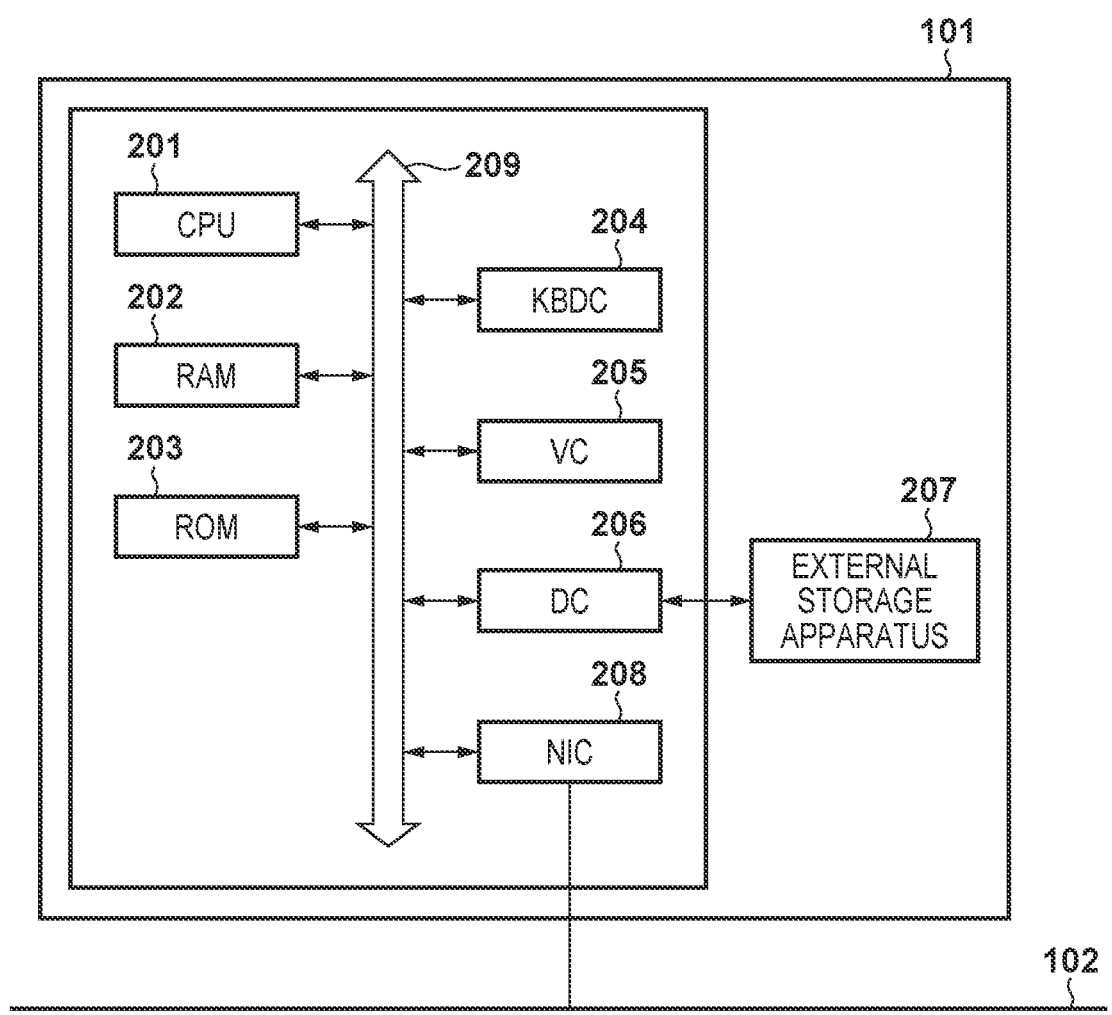
FIG. 2 is a block diagram illustrating an example of a hardware configuration of a host computer.

FIG. 2 is a block diagram illustrating an example of a hardware configuration of the host computer 101. In FIG. 2, the host computer 101 is equipped with a CPU 201, a RAM 202, a ROM 203, and an external storage apparatus 207. The CPU 201 executes software stored in the ROM 203 or the external storage apparatus 207, or downloaded over the network 102, and comprehensively controls each device connected to a system bus 209. The RAM 202 is a storage unit that functions as a main memory, a work area, or the like of the CPU 201. The external storage apparatus 207 is a storage unit configured from a hard disk (HD), a solid state drive (SSD), or the like. The external storage apparatus 207 stores various applications, database data, user files, and the like which include a boot program, an operating system (OS), an authentication server, an authentication client, and the like.

Furthermore, the host computer 101 is equipped with a keyboard controller (KBDC) 204, a video controller (VC) 205, a disk controller (DC) 206, and a network interface controller (NIC) 208. The KBDC 204 sends information inputted from an input unit such as a keyboard, pointing device, or the like (not shown) to the CPU 201. The VC 205 controls a display of the display apparatus comprising an LCD or the like. The DC 206 controls communication with the external storage apparatus 207. The NIC 208 connects the host computer 101 to the network 102 and controls various communication.

(UDP Data Sending Process)

FIG. 3 is a view illustrating an example of a software configuration relating to a UDP data (packet) sending process such as SNMP in the host computer 101. An outline of the flow from when data is sent to when it is resent is described using FIG. 3. Here, configuration is such that the UDP data sending process sends data from the host computer 101 to the image forming apparatuses 103, 104, and 105 connected to the network 102. Also, only the configuration of the host computer 101 is illustrated here, and configuration of the image forming apparatus side is omitted. Note, it is assumed that the image forming apparatus 105 is in a state in which it cannot respond to the UDP data because its power supply is not being inputted.

A send-start unit 301 performs an instruction to send UDP data to the image forming apparatuses 103, 104, and 105. The send-start unit 301 calls a data-send unit 304, a data-receive unit 305, a delay-call control unit 302, and a reception recording unit 306 as appropriate. Then, the send-start unit 301 causes UDP data to be sent to the send-destination image forming apparatus by using the data-send unit 304, and causes the delay-call control unit 302 to add send-information. The send-information will be described later.

The data-send unit 304 sends designated data as UDP data to a designated send-destination. Here, the send-destination of the data is designated by an address. The delay-call control unit 302 calls a delay process by a delay process execution unit 303 with this send-information as an argument after a predetermined elapsed time (T seconds) from when the send-information is added. Here, T is assumed to be defined and held in advance. The send-information inputted to the delay process by the delay-call control unit 302 and the delay process execution unit 303 includes an address of the destination image forming apparatus, a resend retry count, and send-data. Here, a value of the retry count at when the send-start unit 301 causes the delay-call control unit 302 to add the send-information is a data resend count (N times).

The data-receive unit 305 receives, via the network 102, the UDP data sent to the port that the host computer 101 designated. The data-receive unit 305 verifies that the received data is a response to the data sent by the data-send unit 304, and saves to the reception recording unit 306 information (an IP address in this case) that specifies the send-source of the data. The reception recording unit 306 has a function for determining whether or not data from the send-source designated using saved information has been received. Here, the port number of the port on which the data-receive unit 305 awaits reception and the send-source port number when the data-send unit 304 sends data are the same. By this, a response to data sent by the data-send unit 304 is received by the data-receive unit 305. In other words, responses to data sent from the same port are received on the same port even if the data is sent (replied) from different apparatuses.

The delay process execution unit 303, in the delay process, accepts send-information added at the delay-call control unit 302 and makes a query to the reception recording unit 306 at to whether or not data from an IP address in the send-information has been received. In other words, it queries whether or not a response with respect to data sent to the IP address indicated in the send-information has been received. If the result of this query is that data has not been received, the delay process execution unit 303 resends the data by using the data-send unit 304.

Next, in a case where the result of subtracting one from a "retry count" within the send-information is a positive number (>0), the delay process execution unit 303 causes the delay-call control unit 302 to add (update) send-information in which the "retry count" is reduced by one. By this resend process data is resent every T seconds, a maximum of N times, to the destination from which a response was not received (the image forming apparatus 105 in the case of the present example). Thus, data can be sent N+1 times by the initial send and the maximum of N resends. Note, in cases where there is a response from the image forming apparatus 105 such as when the image forming apparatus 105 activates part way through, for example, data is not resent thereafter.

While an example in which the data that is sent is included within send-information is illustrated here, limitation is not made to this. For example, in a case where the data to be sent is defined, "send-data" within the send-information is unnecessary because the data-send unit 304 or the send-start unit 301 and the delay process execution unit 303 create the data to be sent.

Hereinafter, the processing of each block of FIG. 3 is described in detail by giving an example of processing for searching for an image forming apparatus on the network 102. In the search processing, SNMP version 1 (SNMPv1) data is sequentially sent to an address group designated in the network, and receive-data that is received as a response thereto is verified. For example, in the case of 192.16.0.0 to 192.16.255.255, a total of 65536 addresses correspond to the address group here. In such a case, responses are not necessarily returned for all of the sent data due to reasons such as non-existence of a destination to which an address is assigned or non-activation of the destination. Also, destinations from which a response is returned are not necessarily all image forming apparatuses. Also, due to the properties of UDP, the sent SNMP request and response data are not necessarily always received by the destination. Information relating to an address group (a range) that is the target of the above-described search processing is assumed to be held in advance.

[Processing Flow]

Hereinafter, description regarding a processing flow according to the present embodiment is given. Note, each processing flow illustrated hereinafter is realized by the CPU 201 of the host computer 101 reading a program stored in the RAM 202 or the like and executing it.

Figure 4A:
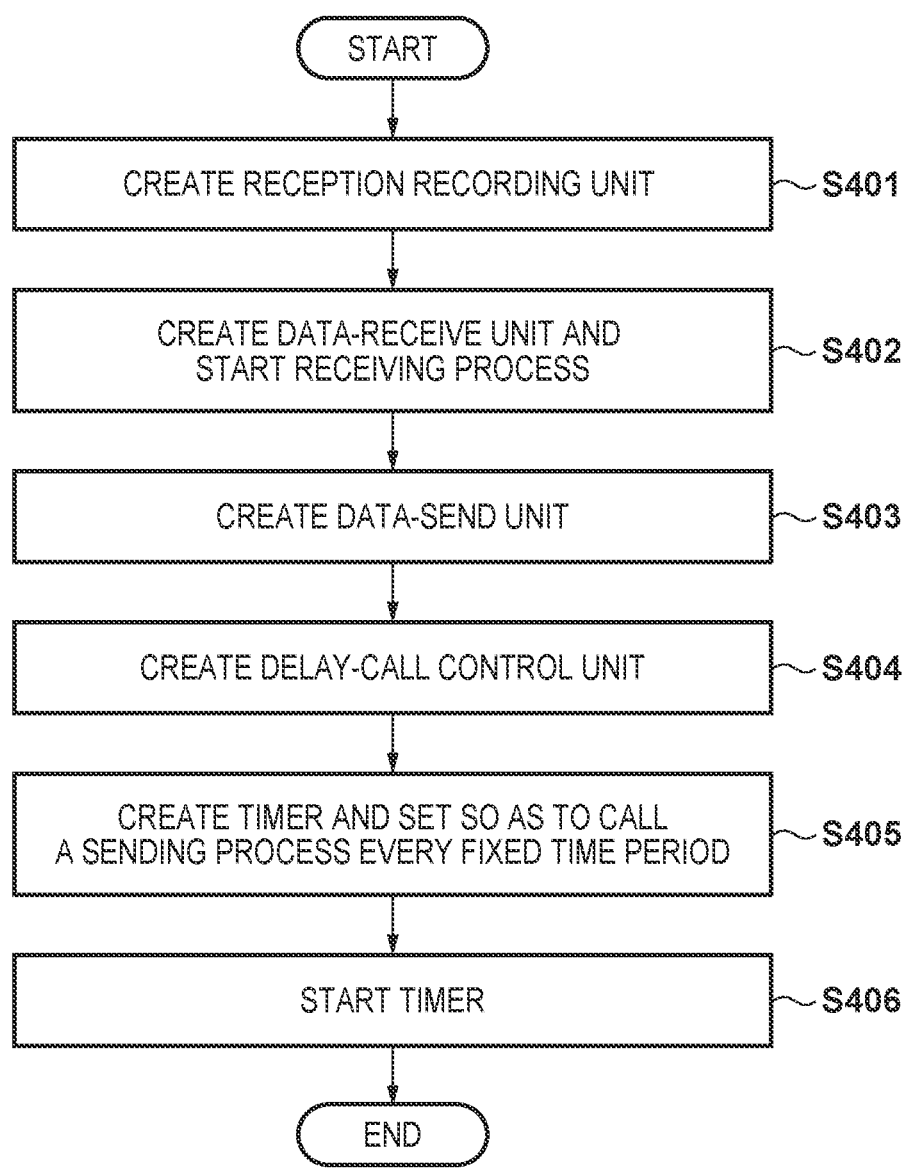
FIG. 4A is a flowchart of initialization processing and timer activation processing.
Figure 4B:
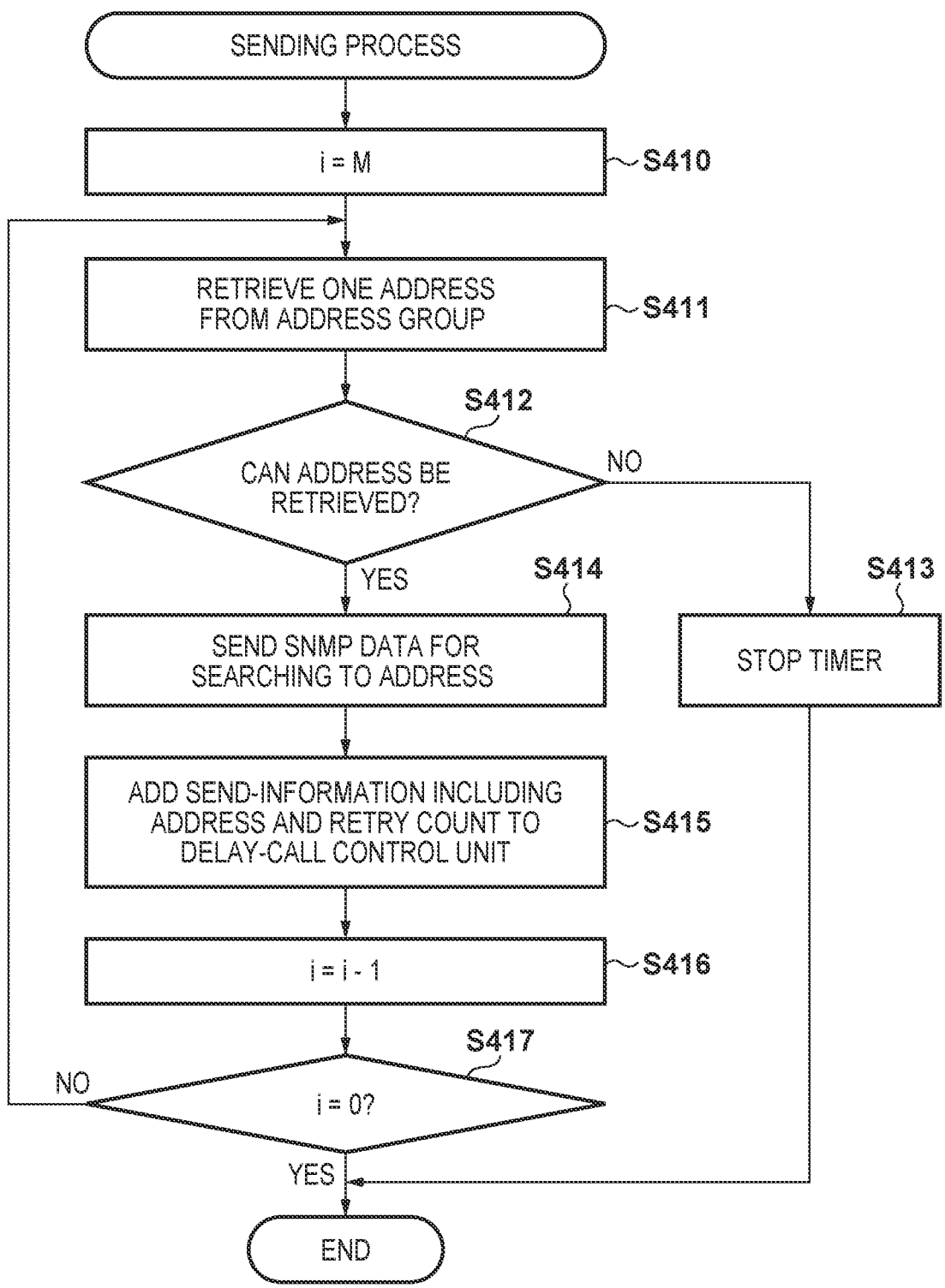
FIG. 4B is a flowchart of a periodic search data sending process.

FIG. 4A and FIG. 4B are flowcharts illustrating the flow of processing of the send-start unit 301 according to the present embodiment. The send-start unit 301 performs various initialization processing and search data sending processing which is executed periodically using a timer. Regarding execution of periodic sending processing using the timer, the mechanism sequentially sends data for searching to a determined number of addresses every second rather than sending a large amount of data for searching in a short time. FIG. 4A is a flowchart for the various initialization processing and timer activation. FIG. 4B is a flowchart for a search data sending process that is executed periodically using a timer.

(Initialization Process)

Firstly, description is given regarding various initialization processing and timer activation processing illustrated in FIG. 4A.

In step S401, the send-start unit 301 creates the reception recording unit 306. Note, "creates" here means that each processing unit is called and setting is performed to execute various processes. The reception recording unit 306 holds a list of IP addresses and has a function for adding a provided IP address to the list and a function for returning whether or not a provided IP address exists within the list.

In step S402, the send-start unit 301 creates the data-receive unit 305 and makes an instruction to the data-receive unit 305 to start receiving UDP data. At this time, an unused port that is automatically assigned by the system is normally used as a data reception port.

In step S403, the send-start unit 301 creates the data-send unit 304. At this time, the send-start unit 301 makes an instruction to the data-send unit 304 to use the receiving port number of the data-receive unit 305 assigned in step S402 as the data-send-source port number.

In step S404, the send-start unit 301 creates the delay-call control unit 302. At this time, the send-start unit 301 sets, for the created delay-call control unit 302, a delay time T and a delay process performed by the delay process execution unit 303 which, after the delay time T elapses from when send-information is inputted, is called using this send-information as an argument.

In step S405, the send-start unit 301 creates the timer and sets so as to call the search data sending process of FIG. 4B every fixed time interval t1. For example, the time interval t1 is set to 1 second, 0.5 seconds, or the like, here.

In step S406, the send-start unit 301 starts the timer created in step S405. By this, by detecting that a fixed time period elapsed by the timer, the search data sending process illustrated in FIG. 4B is activated for each time period. After this, this processing flow ends.

(Search Data Sending Process)

Next, description is given regarding the search data sending process which is activated periodically using the timer and which is illustrated in FIG. 4B.

In step S410, the send-start unit 301 sets a value M to a variable i. Here, M is the number of pieces of search data (send-data) that is sent within a process call interval (time interval t1) according to the timer created in step S405. For example, in a case where the call interval (time interval t1) of the timer is 0.5 seconds, and the search data is sent to 30 addresses every second, M becomes 15 (=30 addresses*(0.5 s/1 s)).

In step S411, the send-start unit 301 obtains one address from the address group designated as the search target. At that time, in a case where an address cannot be obtained, this means that the sending of the search data to every address has completed. Accordingly, an address obtained here is treated as already processed in the address group.

In step S412, the send-start unit 301 determines whether or not an address can be obtained in step S411. The processing advances to step S413 in a case where an address cannot be obtained (NO in step S412), and the processing advances to step S414 in a case where an address can be obtained (YES in step S412).

In step S413, the send-start unit 301 stops the timer. This processing flow is then terminated. Here, when the timer is stopped, thereafter, the periodic search data sending process by the send-start unit 301 is stopped.

In step S414, the send-start unit 301 instructs the data-send unit 304 to send data for searching to the address obtained in step S411. Here, the data for searching, for example, is a GetNext request of a route OID (mib-2.43) of an SNMPv1 printer MIB (RFC 3805). For example, a destination that returns an OID within a PrinterMIB in response to this send-data can be determined to be a printer.

In step S415, the send-start unit 301 creates send-information including an address and a retry count (N), and inputs this send-information to the delay-call control unit 302 created in step S404.

In step S416, the send-start unit 301 reduces the value of the variable i by 1.

In step S417, the send-start unit 301 determines whether or not the variable i is 0. In a case where the variable i is not 0 (NO in step S417), the send-start unit 301 returns to step S411 and executes the same processing for the next search target address. In a case where the variable i is 0 (YES in step S417), the send-start unit 301 ends this processing flow. By the foregoing processing, the search data is sent to M addresses every t1.

Figure 5A:
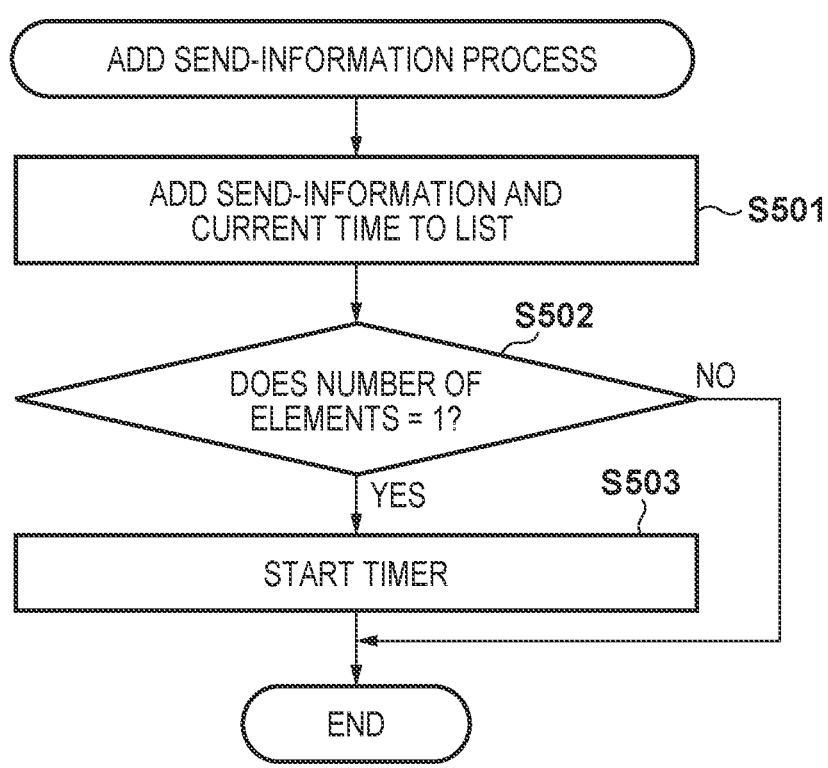
FIG. 5A is a flowchart of a process for adding send-information.
Figure 5B:
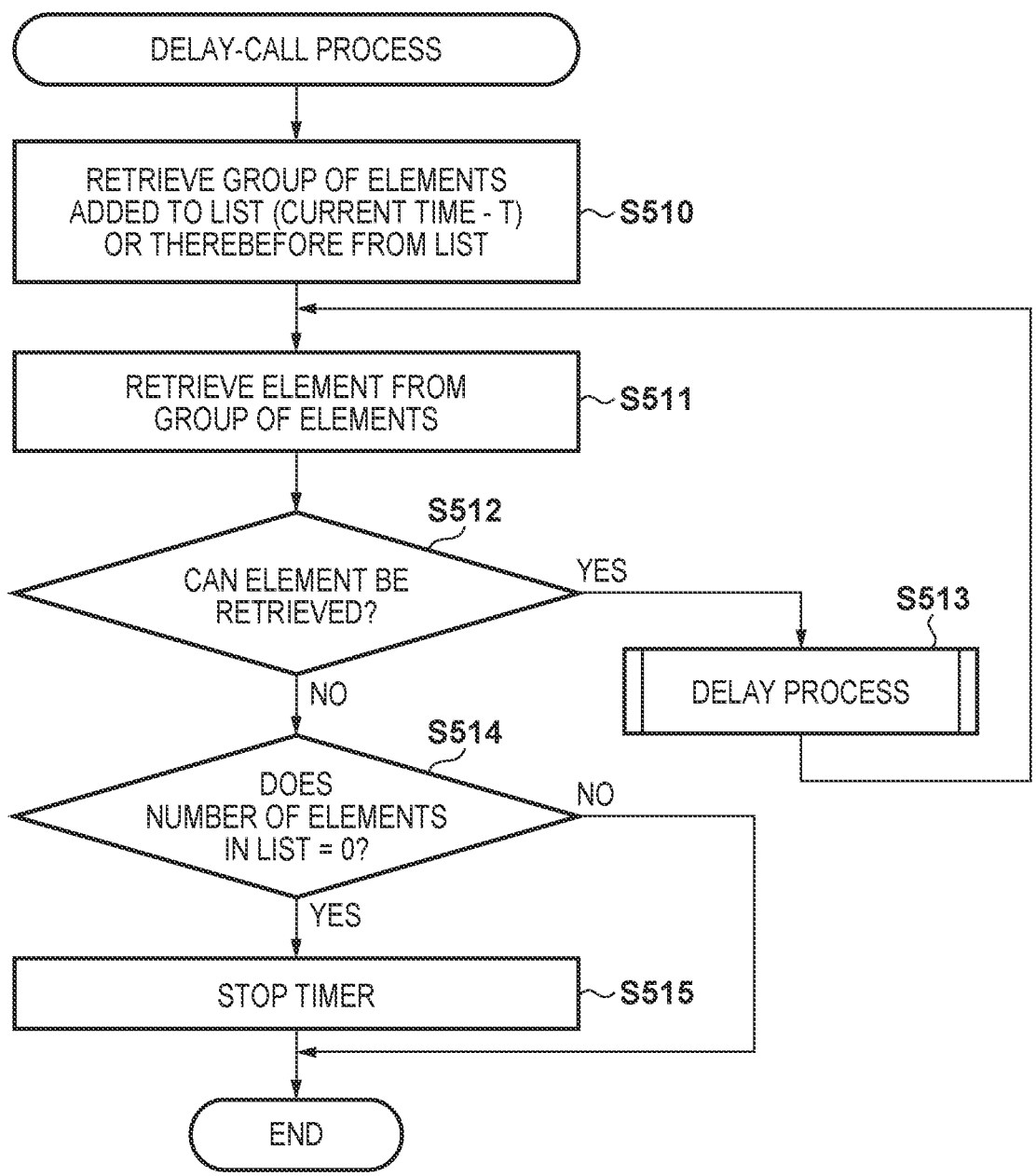
FIG. 5B is a flowchart of a delay-call process.

FIG. 5A and FIG. 5B are flowcharts illustrating the flow of processing of the delay-call control unit 302. FIG. 5A illustrates a flowchart of a process for adding send-information. FIG. 5B is a flowchart of a delay-call process. Note, it is assumed that when the delay-call control unit 302 is called in step S404 of FIG. 4A, the delay-call process illustrated in FIG. 5B is set on a timer such that it is called every time interval t2. Also, the delay-call control unit 302 internally holds a list of data in which added send-information and the time at which it was added are made to be a set.

(Add Send-Information Process)

Details of a process for adding send-information are described using FIG. 5A.

In step S501, the delay-call control unit 302 adds data including send-information passed as an argument and the current time to a list.

In step S502, the delay-call control unit 302 performs a determination of whether or not a number of elements in the list is 1. If the result of the determination is that the number of elements is not 1 (NO in step S502), this processing flow ends. In a case where the number of elements is 1 (YES in step S502), the processing advances to step S503. Here, in a case where the number of elements are greater than or equal to 2, it can be determined that the timer has already been started, and in a case where the number of elements is 0, it can be determined that there is no process that is being delayed. Note, the timer here is described as different from the timer indicated in FIG. 4A.

In step S503, the delay-call control unit 302 starts a timer for calling the delay-call process (FIG. 5B) every time interval t2. By this, the delay-call process illustrated in FIG. 5B is called every time interval t2 using the timer. Note that although the value of the time interval t2 is not particularly limited, it may be set in consideration of a processing load with above described value of the time interval t1, for example. This processing flow is then terminated.

(Delay-Call Process)

In step S510, the delay-call control unit 302 retrieves from the list the group of elements for which the time T or more has passed from when they were added to the list. At that time, the retrieved group of elements is deleted from the list.

In step S511, the delay-call control unit 302 retrieves one element from the retrieved group of elements.

In step S512, the delay-call control unit 302 determines whether or not an element was retrieved in step S511. In a case where an element was not retrieved (NO in step S512) step S514 is transitioned to, and in a case where an element was retrieved (YES in step S512) step S513 is transitioned to.

In step S513, the delay-call control unit 302 calls processing by the delay process execution unit 303 registered in step S404 of FIG. 4A with the send-information within the element as an argument. After this, step S511 is transitioned to in order for the delay-call control unit 302 to perform processing on the next element of the group of elements retrieved from the list.

In step S514, the delay-call control unit 302 determines whether or not the list is empty. In a case where the list is empty (YES in step S514), step S515 is transitioned to, and in a case where the list is not empty (NO in step S514), this processing flow is ended. In a case where the list is empty, this means that the delay process has completed for every element.

In step S515, the delay-call control unit 302 stops the timer started in step S503. By this, unnecessary calling of the delay-call process is inhibited. After this, this processing flow ends.

(Delay Process)

Figure 6:
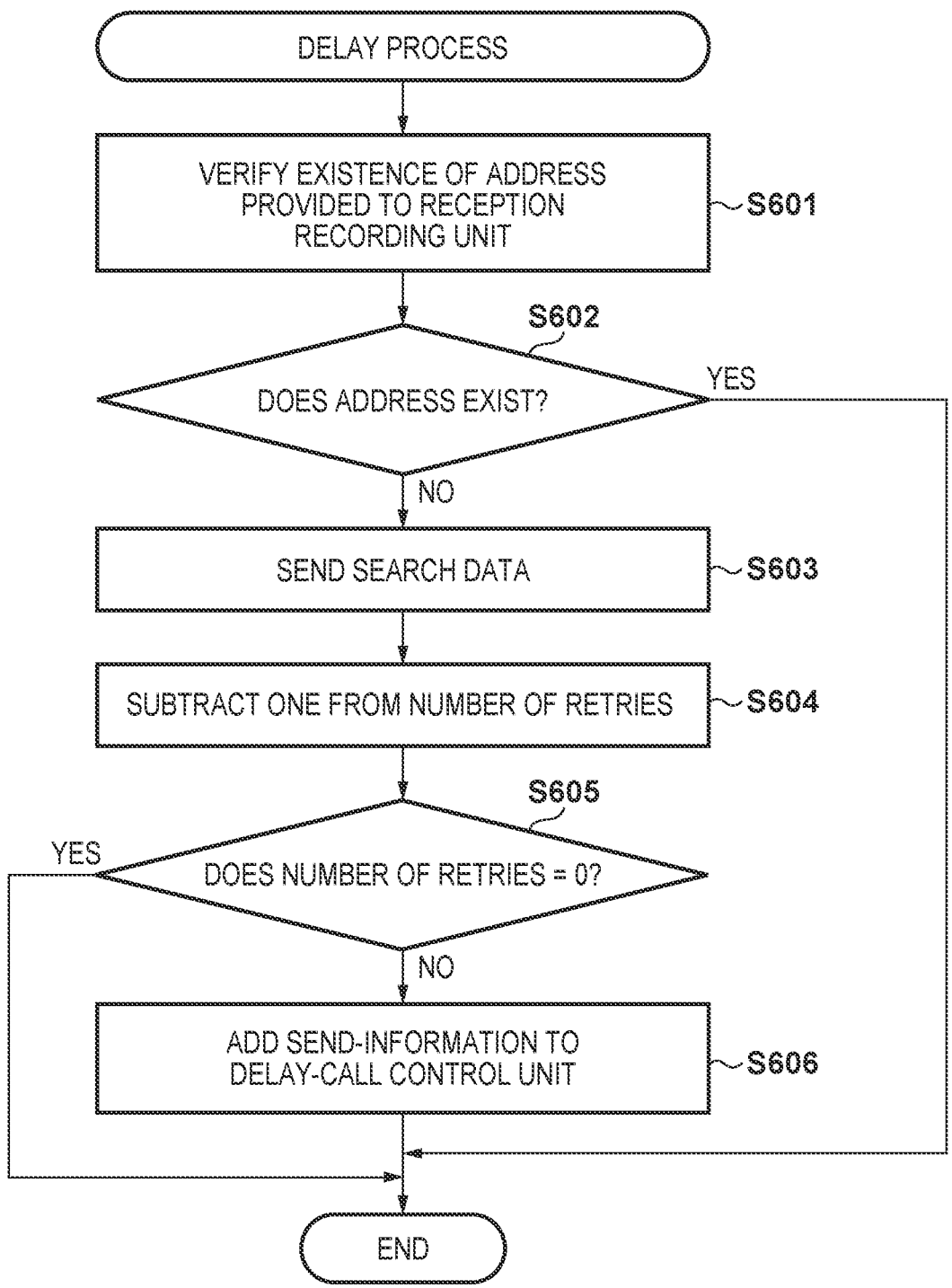
FIG. 6 is a flowchart of a delay process.

FIG. 6 is a flowchart illustrating the flow of a delay process which is called in step S513 of FIG. 5B and is according to the delay process execution unit 303 registered in the delay-call control unit 302 in step S404 of FIG. 4A.

In step S601, the delay process execution unit 303 queries the reception recording unit 306 as to whether or not an address within the send-information passed as an argument is present within the reception recording unit 306.

In step S602, the delay process execution unit 303 determines whether or not an address is present from the result of the query of step S601. In a case where an address is present (YES in step S602), in other words, in a case where the data-receive unit 305 has already received a response to the search data sent to the address, the delay process execution unit 303 ends this processing flow. If the result of the verification is that an address is not present (NO in step S602), in other words, in a case where the data-receive unit 305 has yet to receive a response from the address, step S603 is transitioned to.

In step S603, the delay process execution unit 303 instructs the data-send unit 304 to send (resend) the search data.

In step S604, the delay process execution unit 303 subtracts 1 from the retry count within the send-information accepted as an argument.

In step S605, the delay process execution unit 303 determines whether or not the subtracted result retry count is 0. In a case where the retry count is 0 (YES in step S605), in other words, in a case where the search data has been already resent N times (number of times designated in send-information), this processing flow ends. In a case where the retry count is not 0 (NO in step S605), in other words, in a case where the search data has yet to be resent N times, step S606 is transitioned to.

In step S606, the delay process execution unit 303 adds reception information in which the retry count is subtracted by 1 in step S604 to the delay-call control unit 302. After this, this processing flow ends.

(Receiving Process)

Figure 7:
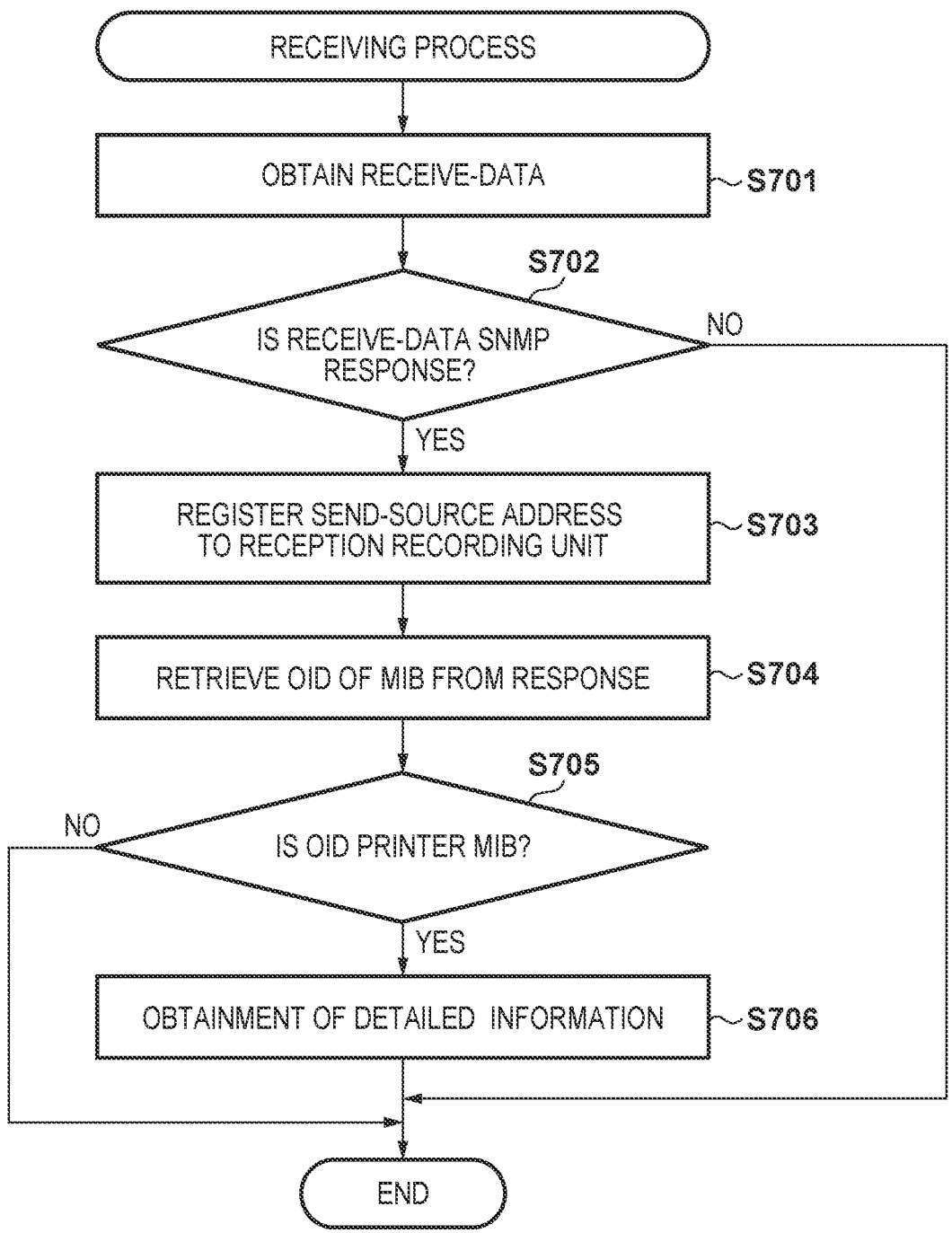
FIG. 7 is a flowchart of a receiving process.

FIG. 7 is a flowchart illustrating the flow of the receiving process for when the data-receive unit 305 receives data from the network. Here, in the receiving processing, it is assumed that received data and the address of the send-source of the data can be obtained.

In step S701, the data-receive unit 305 obtains the receive-data.

In step S702, the data-receive unit 305 determines whether or not the received data is SNMP response data. In a case where the received data is not an SNMP response (NO in step S702), this processing flow ends. In a case where the received data is an SNMP response (YES in step S702), step S703 is transitioned to.

In step S703, the data-receive unit 305 retrieves the address of the send-source of the receive-data, and registers it to the reception recording unit 306.

In step S704, the data-receive unit 305 retrieves the OID of the SNMP MIB from the receive-data obtained in step S701.

In step S705, the data-receive unit 305 determines whether or not the MIB OID within the SNMP response retrieved in step S704 is a printer MIB. Here, the OID being a printer MIB specifically means that the OID is started in a route OID (mib-2.43) of the printer MIB (RFC 3805). In a case where the received SNMP response is not a printer MIB (NO in step S705), this processing flow ends. In a case where the received SNMP response is a printer MIB (YES in step S705), the data-receive unit 305 transitions to step S706. Note, in a case where the apparatus of the search target is something other than an image forming apparatus, it is assumed that this determination is made in correspondence with the type of the apparatus.

In step S706, the data-receive unit 305 requests a detailed information obtaining unit (not shown) to obtain detailed information. The detailed information obtaining unit obtains, based on the request from the data-receive unit 305, detailed information from the image forming apparatus that sent the receive-data. Although it is assumed that operation information, status information, or the like of the image forming apparatus is included in this detail information, the detailed information is not particularly limited to this. This processing flow is then terminated.

Note, it is not necessary for the search data to be sent in step S414 of FIG. 4B and the search data to be sent in step S603 of FIG. 6 to always be identical. For example, assume that a plurality of SNMPv1 community names to be used in a search are designated, and that one of these is a predetermined value. Configuration may be taken such that this community is used in the first sending in step S414, and a plurality of pieces of search data respectively designating every designated community name are sent in the subsequent step S603.

By virtue of the present embodiment above, it becomes possible to resend, a plurality of times, send-data for which no response to send-data was returned while economizing communication ports of a host.

Second Embodiment

Description is given regarding the second embodiment of the invention of the present application. In the first embodiment, only one version (SNMPv1) is used as the SNMP used in the search processing. In contrast to this, description is given regarding a configuration in which search processing is performed by using a plurality of versions corresponding to the specifications of image forming apparatuses in the present embodiment.

Figure 8:
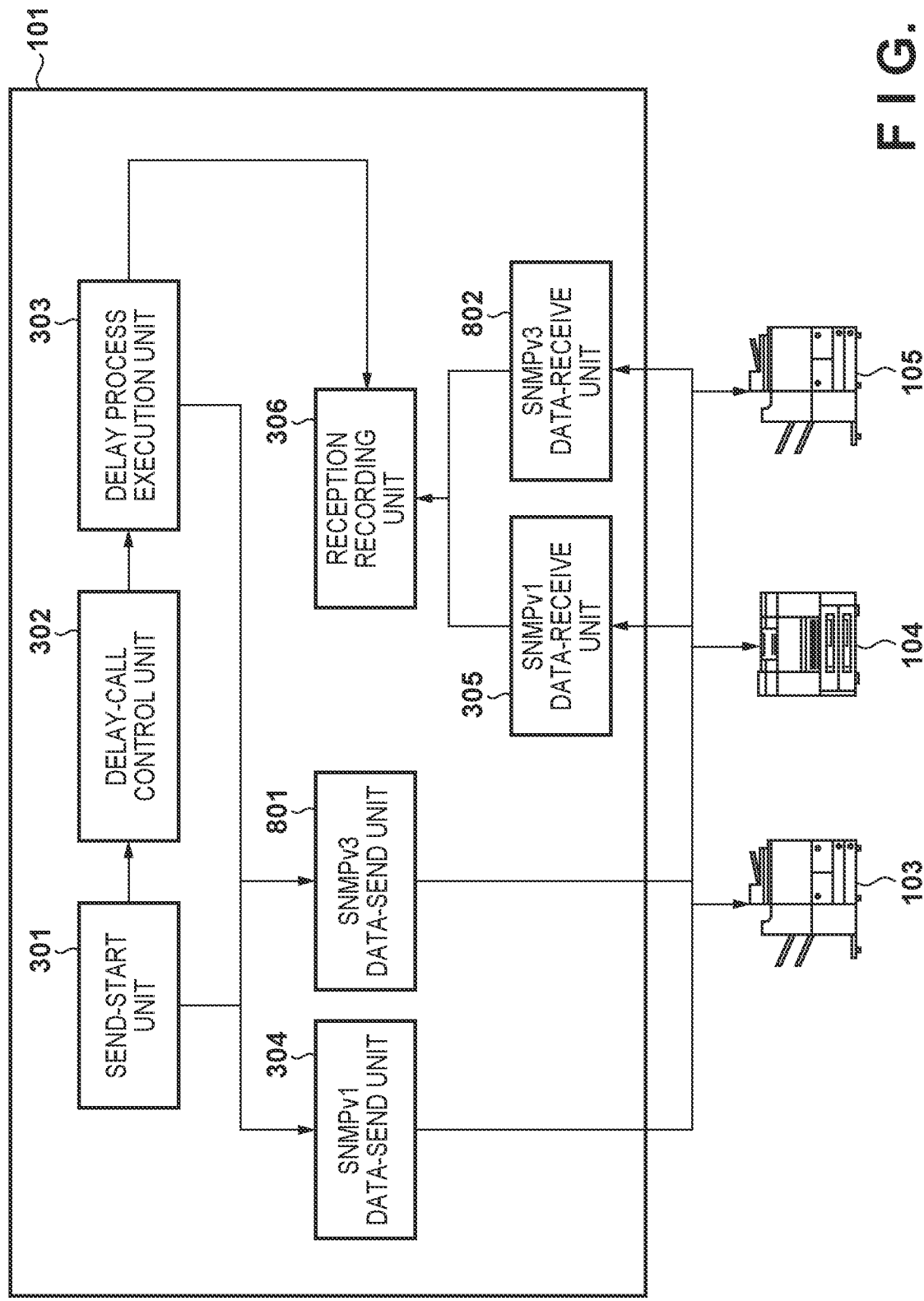
FIG. 8 is a view illustrating an example of a configuration of a processing unit according to a second embodiment.

FIG. 8 is a view illustrating an example of a software configuration relating to processing in a case where search processing is executed by using SNMP version 1 (SNMPv1) and version 3 (SNMPv3) according to the present embodiment. Description is given for parts that are the same as in the configuration of FIG. 3 illustrated in the first embodiment by using the same reference numerals. Also, only parts differing from the first embodiment, even in relation to processing, are described.

In the case of SNMPv3, it is necessary to obtain engine information in advance from the SNMP agent prior to sending a request for an MIB value. Here, the engine information is configured to include an engine ID, an engine boot, and an engine timer. Because details are described in RFC3414 or the like, description here is omitted.

In FIG. 8, an SNMPv3 data-send unit 801 sends data for requesting SNMPv3 engine information. An SNMPv3 data-receive unit 802 receives a response to the data sent from the SNMPv3 data-send unit 801.

The data-send unit 304 and the data-receive unit 305 are units used in SNMPv1 data transmission/reception, and correspond to the data-send unit 304 and the data-receive unit 305 of FIG. 3 described in the first embodiment. Here, they are respectively described as an SNMPv1 data-send unit and an SNMPv1 data-receive unit. Their respective operations are as described in the example of the search processing of the image forming apparatus on the network 102 using SNMPv1 as described in the first embodiment.

In the present embodiment, the SNMPv1 data-receive unit 305 and the SNMPv3 data-receive unit 802 are created in step S402 of FIG. 4A. These wait for the reception of data on separate ports. Also, the SNMPv1 data-send unit 304 and the SNMPv3 data-send unit 801 are created in the step of step S403. Here, the respective ports on which the SNMPv1 data-receive unit 305 and the SNMPv3 data-receive unit 802 await reception are set for the respective data-send units so as to be used as the send-source of the data. Furthermore, the search data sending process of step S414 of FIG. 4B and of step S603 of FIG. 6 sends the following two pieces of data.

1. Using the SNMPv1 data-send unit 304, printer MIB route OID (mib-2.43) GetNext SNMPv1 request data 2. Using the SNMPv3 data-send unit 801, SNMPv3 request data for obtaining engine information of the SNMP agent

[Process Flow]

Figure 9:
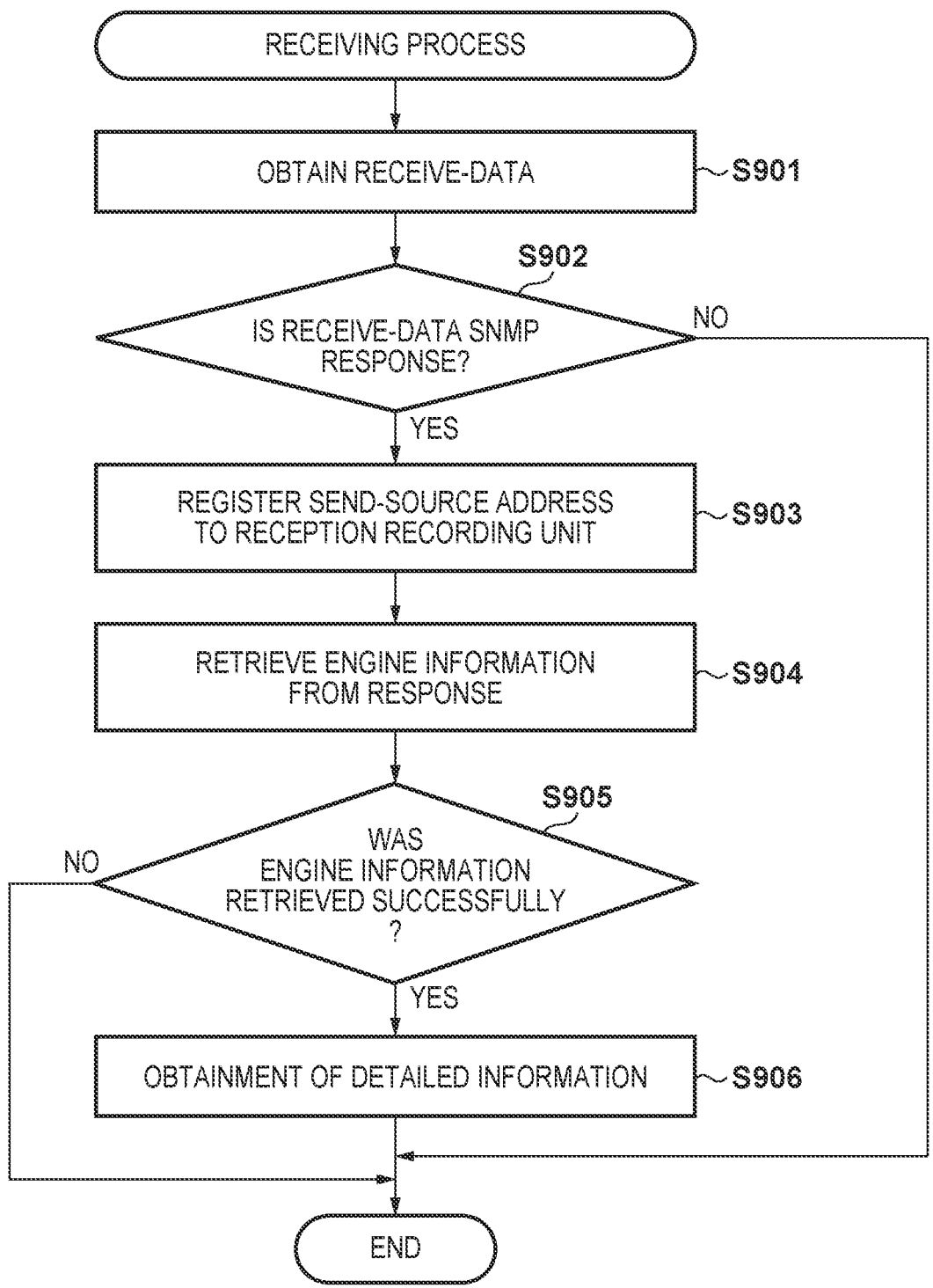
FIG. 9 is a flowchart of the receiving process according to the second embodiment.

FIG. 9 is a flowchart illustrating the flow of the receiving process for when the SNMPv3 data-receive unit 802 receives data via the network 102. Note, each processing flow illustrated hereinafter is realized by the CPU 201 of the host computer 101 reading a program stored in the RAM 202 or the like and executing it. Here, in the receiving processing, it is assumed that received data and the address of the send-source of the data can be obtained.

In step S901, the SNMPv3 data-receive unit 802 obtains the receive-data.

In step S902, the SNMPv3 data-receive unit 802 determines whether or not the received data is SNMP response data. In a case where the received data is not an SNMP response (NO in step S902), this processing flow ends. In a case where the received data is an SNMP response (YES in step S902), step S903 is transitioned to.

In step S903, the SNMPv3 data-receive unit 802 retrieves the address of the send-source of the receive-data, and registers it to the reception recording unit 306.

In step S904, the SNMPv3 data-receive unit 802 retrieves engine information of the SNMPv3 agent from the receive-data obtained in step S901.

In step S905, the SNMPv3 data-receive unit 802 determines whether or not retrieval of the engine information succeeded. In a case where retrieval of the engine information failed (NO in step S905), this processing flow ends. In a case where retrieval of the engine information succeeded (YES in step S905), step S906 is transitioned to.

In step S906, the SNMPv3 data-receive unit 802 requests a detailed information obtaining unit (not shown) to obtain detailed information. The detailed information obtaining unit (not shown) obtains, based on the request from the SNMPv3 data-receive unit 802, detailed information from the image forming apparatus that sent the receive-data. Although it is assumed that operation information, status information, or the like of the image forming apparatus is included here, the detailed information is not particularly limited to this. Next, this processing flow ends.

In addition to the effects of the first embodiment, it becomes possible to perform search processing corresponding to a plurality of SNMP versions in the present embodiment.

Third Embodiment

Description is given regarding a third embodiment of the invention. For the present embodiment, an application that manages image forming apparatuses connected on a network collects the statuses of the plurality of image forming apparatuses which are the targets of the management by using SNMP.

Among the image forming apparatuses, there are those that notify the network accordingly when transitioning to a power-saving mode and when recovering from the power-saving mode, prior to a power off, and periodically in the case of a normal operating mode. By this, the management application can manage the power supply status of the management target image forming apparatus. However, not all the management target image forming apparatuses have this function, and a notification cannot necessarily be received reliably. Also, among the image forming apparatus there are those that transition from the power-saving mode to normal operating mode upon reception of SNMP data, but do not send a response corresponding to the SNMP data received at that time.

In order to support such a case, status collection processing of the management application performs the following operations.

1. Check the power supply status of the image forming apparatus of the management target, and do not send data for status obtainment in a case of power off or the power-saving mode.

2. Send an SNMP request in order to verify whether the image forming apparatus sends a response to the SNMP request in a case where the power supply status is not power off or power-saving mode (in other words, normal operating mode or status unclear).

3. Execute status obtainment processing for an image forming apparatus that returned a response to the SNMP request in step 2.

4. Repeat step 2 N times with the interval of time T for an image forming apparatus that did not return the response to the SNMP response in step 2.

The entire configuration is the same as FIG. 8 illustrated in the second embodiment. Also, only parts differing from the first and second embodiments are described below because basic operations and operations of each configuration element of the first and second embodiments are the same.

An address is used as information identifying each destination in previously described embodiments. Meanwhile, in the present embodiment, information (hereinafter, described as an image forming apparatus ID) for uniquely identifying an image forming apparatus assigned to each image forming apparatus is used. In the present embodiment, it is assumed that the host computer 101 is equipped with a management application for managing each image forming apparatus. It is assumed that the management application holds a list of management target image forming apparatuses and can obtain various pieces of information relating to a target image forming apparatus from the list by using an image forming apparatus ID. Here, the various pieces of information include the address of the image forming apparatus, an SNMPv1 community name, and SNMPv3 authentication information. In conjunction with this, the information stored in the reception recording unit 306 described in previously described embodiments is an image forming apparatus ID rather than an address, and the image forming apparatus ID rather than the address is used in each process of step S601 of FIG. 6, step S703 of FIG. 7, and step S903 of FIG. 9.

[Process Flow]

Figure 10:
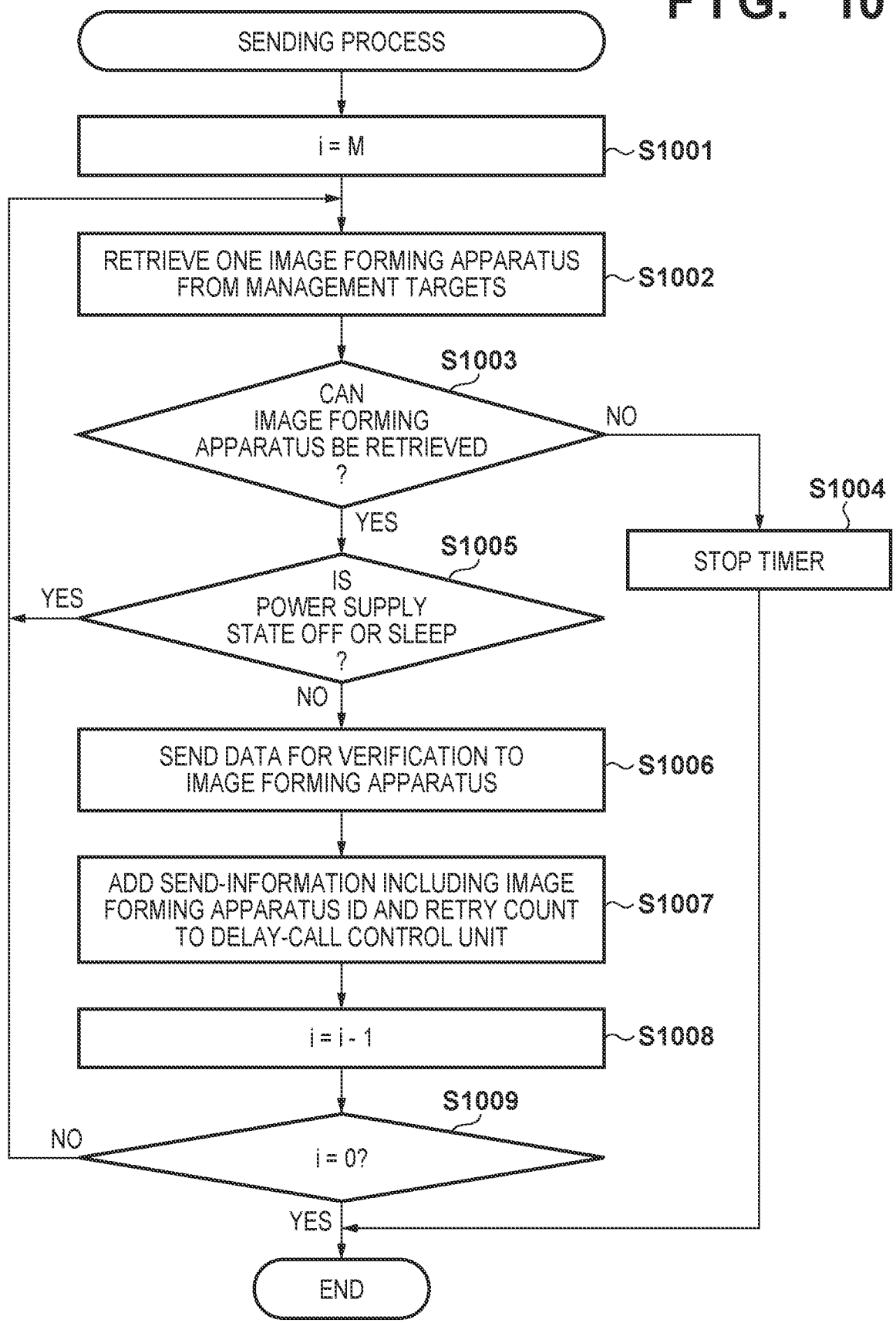
FIG. 10 is a flowchart of the sending process according to a third embodiment.

FIG. 10 is a flowchart of a sending process, corresponding to part of the processing of FIG. 4B described in the first and second embodiments in which the send-start unit 301 sends initial data to each image forming apparatus.

In step S1001, the send-start unit 301 sets a value M to a variable i. Here, M is the number of pieces of search data that is sent within a process call interval (time interval t1) according to the timer created in step S405.

In step S1002, the send-start unit 301 retrieves one image forming apparatus from a group of management target image forming apparatuses.

In step S1003, the send-start unit 301 determines whether or not obtainment of the image forming apparatus succeeded. In a case where obtainment of the image forming apparatus failed (NO in step S1003), in other words, in case where processing with respect to every management target image forming apparatus has been performed, step S1004 is transitioned to. In a case where obtainment of the image forming apparatus succeeded (YES in step S1003), step S1005 is transitioned to.

In step S1004, the send-start unit 301 stops the timer. Then, this processing flow ends.

In step S1005, the send-start unit 301 verifies the power supply status of the obtained image forming apparatus with the power supply status management unit (not shown). The power supply status management unit (not shown) receives a power supply status notification from the image forming apparatus, holds the power supply status of the image forming apparatus (off/power-saving mode/normal operating mode/unknown), and returns the power supply status of the image forming apparatus designated in accordance with the request. Note, the power supply status is not limited to what is described above, and may be another status. As a result of this verification, in a case where the power supply status of the obtained image forming apparatus is off or in the power-saving mode (YES in step S1005), step S1002 is transitioned to, and the same processing is executed on the next management target image forming apparatus. In a case where the power supply status of the obtained image forming apparatus is something other than what was described above (NO in step S1005) step S1008 is transitioned to.

In step S1008, the send-start unit 301 sends data for verification to the obtained image forming apparatus. The following operations are performed as the data sending process for verification.

1. Send SNMPv3 data that obtains engine information by using the SNMPv3 data-send unit 801 in a case where SNMPv3 authentication information is set for the obtained image forming apparatus.

2. Send an SNMPv1 SysObjectID Get request by using the SNMPv1 data-send unit 304 in a case where an SNMPv1 community name is set for the obtained image forming apparatus.

In step S1007, the send-start unit 301 creates send-information including information that uniquely identifies the obtained image forming apparatus and the retry count (N), and inputs it in relation to the delay-call control unit 302 created in step S404.

In step S1008, the send-start unit 301 reduces the value of the variable i by 1.

In step S1009, the send-start unit 301 determines whether or not the variable i is 0. In a case where the variable i is not 0 (NO in step S1009), step S1002 is transitioned to, and the same processing is executed on the next management target image forming apparatus. In a case where the variable i is 0 (YES in step S1009), this processing flow ends. By the foregoing processing, the verification data is sent to M image forming apparatuses every time interval t1.

In the present embodiment, it is a SysObjectID value that is OID verified in step S705 of FIG. 7, because the data that the SNMPv1 data-send unit 304 sends is a SysObjectID Get request. Also, the calls in step S706 of FIG. 7 and in step S906 of FIG. 9 are calls of image forming apparatus status obtainment processes.

By virtue of the foregoing present embodiment, it is possible to control the sending of data and to restrict pointless sending/resending of data in accordance with the status of the image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-014514, filed Jan. 30, 2017, which is hereby incorporated by reference herein in its entirety.

What is claimed is:

1. A communication apparatus that performs communication with apparatuses connected via a network, comprising,
    a memory storing instructions, and
    at least one processor executing the instructions to cause the communication apparatus to:
        create a reception controller for monitoring a receiving port;
        create a first controller, wherein the receiving port is assigned as a data-send-source port of the first controller;
        send, by the first controller, data to a plurality of designated destinations without waiting for a response from each of the plurality of destinations;
        record, by a second controller, send-time information and destination information to a list, according to each data sending;
        initiate a timer upon the recording of the send-time information according to each data sending;
        in a case where a response to one of a plurality of the data sending is received via the receiving port monitored by the reception controller, record information of a send-source of the response;
        send a request for detailed information to the send-source of the received response,
        in a case where a predetermined amount of time has elapsed on the timer, determine, by the second controller, whether the recorded destination information in the list is recorded as the information of the send-source of the response based on a query; and
        resend, by the first controller, data to a destination indicated by the destination information that has not been recorded as the information of the send-source of the response, according to an instruction from the second controller based on the determination,
    wherein in a case where the predetermined amount of time has not elapsed on the timer, the determination by the second controller is not performed.

2. The communication apparatus according to claim 1,
    wherein the instructions further cause the communication apparatus to manage a maximum resend count, and
    wherein a resending of data is controlled based on the maximum resend count.

3. The communication apparatus according to claim 1,
    wherein the data sending is performed to a predetermined number of destinations of the plurality of designated destinations at every first time interval.

4. The communication apparatus according to claim 1,
    wherein the instructions further cause the communication apparatus to determine, at every second time interval, whether or not to resend data.

5. The communication apparatus according to claim 1,
wherein the first controller uses a predetermined communication method;
    wherein the instructions further cause the communication apparatus to create a third controller using another communication method, wherein another receiving port is set as a data-send-source port of the third controller, and wherein the communication methods are differing protocols or versions of a protocol respectively.

6. A communication method in a communication apparatus connected to an apparatus via a network, the method comprising:
creating a reception controller for monitoring a receiving port;
creating a first controller, wherein the receiving port is assigned as a data-send-source port of the first controller;
sending, by the first controller, data to a plurality of designated destinations without waiting for a response from each of the plurality of destinations;
recording, by a second controller, send-time information and destination information to a list, according to each data sending;
initiating a timer upon the recording of the send-time information according to each data sending;
in a case where a response to one of a plurality of the data sending is received via the receiving port monitored by the reception controller, recording information of a send-source of the response;
sending a request for detailed information to the send-source of the received response,
in a case where a predetermined amount of time has elapsed on the timer, determining, by the second controller, whether the recorded destination information in the list is recorded as the information of the send-source of the response based on a query; and
resending, by the first controller, data to a destination indicated by the destination information that has not been recorded as the information of the send-source of the response, according to an instruction from the second controller based on the determination,
wherein in a case where the predetermined amount of time has not elapsed on the timer, the determination by the second controller is not performed.

7. A non-transitory computer-readable storage medium storing a program for causing a computer to:
create a reception controller for monitoring a receiving port;
create a first controller, wherein the receiving port is assigned as a data-send-source port of the first controller;
send, by the first controller, data to a plurality of designated destinations without waiting for a response from each of the plurality of destinations;
record, by a second controller, send-time information and destination information to a list, according to each data sending;
initiate a timer upon the recording of the send-time information according to each data sending;
in a case where a response to one of a plurality of the data sending is received via the receiving port monitored by the reception controller, record information of a send-source of the response;
send a request for detailed information to the send-source of the received response,
in a case where a predetermined amount of time has elapsed on the timer, determine, by the second controller, whether the recorded destination information in the list is recorded as the information of the send-source of the response based on a query; and
resend, by the first controller, data to a destination indicated by the destination information that has not been recorded as the information of the send-source of the response, according to an instruction from the second controller based on the determination,
wherein in a case where the predetermined amount of time has not elapsed on the timer, the determination by the second controller is not performed.

* * * * *